Sept. 2, 1924.
J. A. BUTTRESS ET AL
1,507,332
METHOD OF MANUFACTURING COMPOSITION WALL BOARD
Filed Dec. 27, 1923
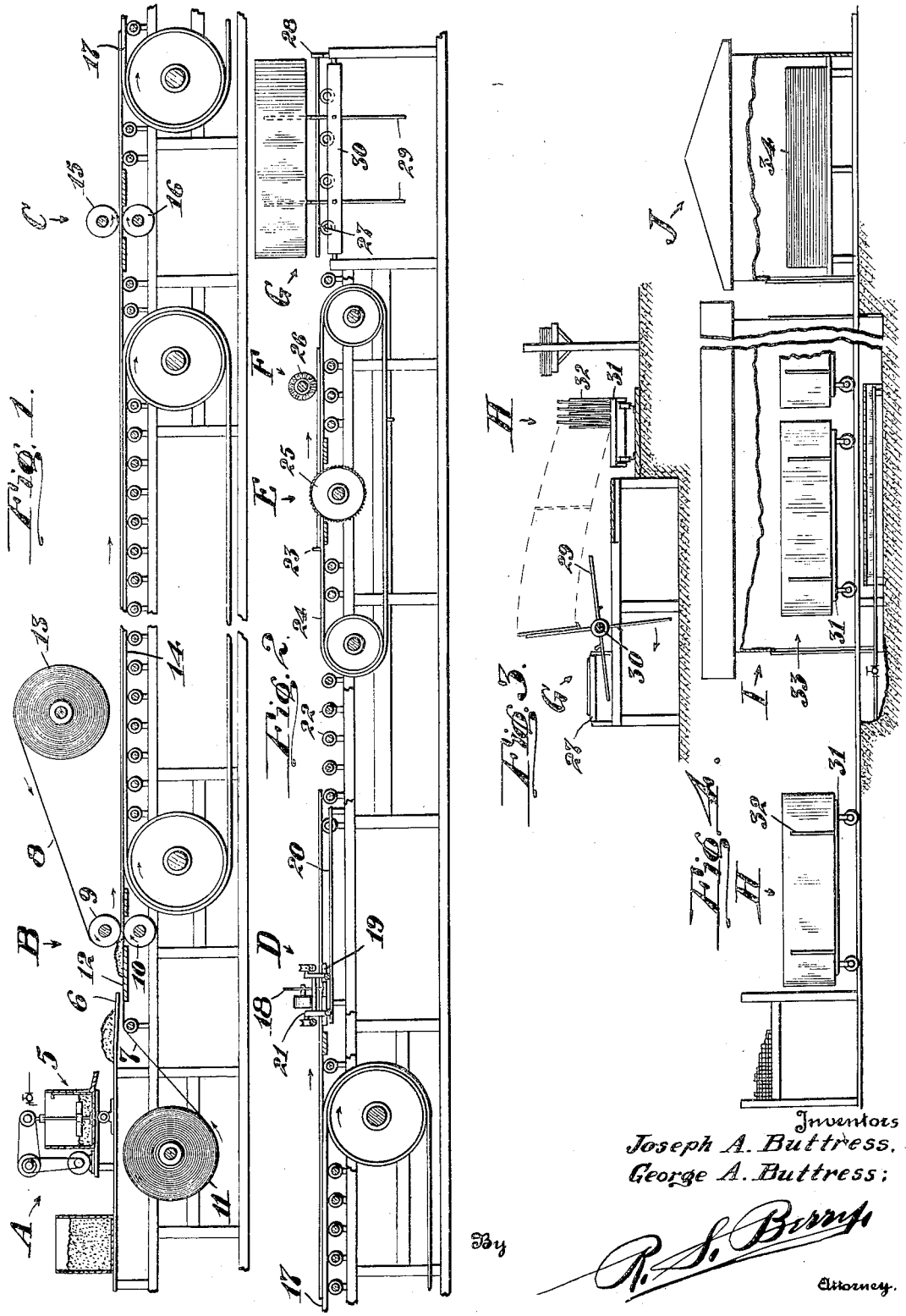
Inventors
Joseph A. Buttress.
George A. Buttress;
By R. S. Berry
Attorney.

Patented Sept. 2, 1924.

1,507,332

UNITED STATES PATENT OFFICE.

JOSEPH A. BUTTRESS AND GEORGE A. BUTTRESS, OF LOS ANGELES, CALIFORNIA, ASSIGNORS TO REX GOODCELL, OF LOS ANGELES, CALIFORNIA.

METHOD OF MANUFACTURING COMPOSITION WALL BOARD.

Application filed December 27, 1923. Serial No. 682,880.

*To all whom it may concern:*

Be it known that we, JOSEPH A. BUTTRESS and GEORGE A. BUTTRESS, citizens of the United States, residing at Los Angeles, in the county of Los Angeles and State of California, have invented new and useful Improvements in Methods of Manufacturing Composition Wall Board, of which the following is a specification.

This invention pertains to a method of manufacture of composition wall boards such as are commonly used as a substitute for lath and plaster in the construction of wall surfaces, and especially relates to the manufacture of that type of wall board embodying a plastic body in the form of a panel having facing sheets of fibrous material on the opposite sides thereof. The invention particularly pertains to that class of methods of manufacture of wall boards of the character above set forth in which a plastic material, ordinarily embodying a mixture of plaster of Paris, sawdust or other filling medium, and water, is fed, while wet and in a pasty state, between two moving horizontally disposed facing sheets of paper or analogous material, and pressed by passing the facing sheets with the interposed layer of soft plastic between rollers to form a continuous strip of wall board which is thereafter cut to form panels of commercial sizes.

In the art of manufacturing wall boards prior to this invention, the strip formed in the manner just explained, has been cut into suitable lengths while the strip is advancing and while the plastic is soft, and the severed lengths or panels stacked in superposed horizontal layers with adjacent panels in superficial contact, this stacking of the panels being done while the board is "green" and before the plastic has become thoroughly set and while in a wet, soft, form. The stack of green board, comprising any suitable number of layers, is then subjected to an initial drying action by being allowed to stand for such length of time as to permit the plastic body to become set, whereupon the panels while in a stack, are trimmed along their longitudinal margins to remove ragged edges and form the panels of uniform commercial widths, and in some instances the stack of panels is cut transversely to form boards of commercial lengths. The boards in finished sizes are then turned to stand on edge and while in this position are placed in a suitable kiln where they are thoroughly dried to form the finished product.

Furthermore, in this old process, it has been the practice to use facing sheets of paper that have been waterproofed or rendered impervious to moisture and to employ a slow setting plastic in order to obtain a satisfactory adhesion between the wet plastic and the facing sheets; a slow setting plastic being used to facilitate formation of the panel, and the treated facing sheets being used to prevent too rapid absorption of moisture from the wet plastic which would impair the strength of the set plastic and furthermore would interfere with the adherence of the facing sheets to the plastic, as well as soften the facing sheets to such extent as to render the formation of the board difficult. Because of the use of slow setting plastic and paper facing sheets of moisture-resistant character, it is necessary to stack the green board in horizontal layers and then subject the stack to an initial drying action so as to harden the plastic before cutting the board into finished or commercial sizes, as the element of time is essential to the set of the plastic and the adherence of the paper facing sheets thereto.

An object of this invention is to provide a method of manufacturing wall board of the character above described, whereby the necessity of employing waterproofed paper facing sheets is obviated and by which a satisfactory product may be readily obtained by the use of facing sheets formed of the ordinary pulp board paper of commerce which is somewhat moisture absorbent.

Another object is to provide a method whereby the board may be formed and cut to finished sizes in a continuous operation so as to obviate stacking lengths of the board before reducing it to finished or commercial sizes thereby enabling rapidity of output.

Another object is to provide a method in which adhesion of the facing sheets to the plastic body throughout the contiguous areas thereof will be insured, and whereby such adherence of the facing sheets to the plastic body will be effected throughout the surface of the board so as to minimize subsequent separation or peeling of the facing sheets from the plastic body.

A further object is to provide a method of manufacturing a composition wall board which will permit the use of a quick-setting plastic material whereby rapidity of output of the product may be accomplished.

The manner of carrying out the invention is illustrated in the accompanying drawings, in which—

Figures 1 and 2 are diagrams illustrating in side elevation instrumentalities for initially forming the board in a continuous length and cutting it to finished sizes in readiness for subjecting it to a kiln-drying action.

Figure 3 is a diagram illustrating the manner of removing the wall board from the forming mechanism preparatory to conveying the finished lengths to the kiln.

Figure 4 is a diagram illustrating the manner in which the board is conveyed through a kiln and finally stacked in readiness for use.

In the drawings, the various instrumentalities for carrying out the steps employed in the manufacture of the wall board are designated consecutively by reference letters A, B, C, D, E, F, G, H, I, and J, which instrumentalities are, for convenience, termed stations, and will be hereinafter fully described.

At station A a quick setting plastic composition is formed of plaster of Paris, sawdust, dextrine and water, or analogous materials, which materials are delivered to a mixer 5 of any suitable construction where they are thoroughly intermixed and delivered to a table 6. An important feature of the invention resides in incorporating dextrine or a similar material having adhesive properties, with the plaster of Paris and water so as to impart the quality of stickiness to the plastic composition, whereby the plastic will be caused to readily adhere to the facing sheets. The plastic composition is delivered from the table 6 while in a wet, pasty condition and fed between two moving superimposed facing sheets 7 and 8 at station B; the facing sheets passing between horizontal superimposed rollers 9 and 10. The sheet 7 is fed from a roll 11 over a platform 12 located between rollers 9—10 and the table 6; the upper surface of the platform 12 extending on a plane with the uppermost portion of the lower roller 10. The facing sheet 8 is fed from a roll 13 and passed around the upper roller 9. The plastic composition is spread on the lower facing sheet 11 as the latter passes over the platform 12 adjacent the rollers 9 and 10 in such manner as to feed between the facing sheets and become interposed therebetween as the facing sheets pass between the rollers 9—10. This discharge of the plastic composition from the table 6 and spreading upon the lower facing sheet may be accomplished in any desired manner. In practice, it has been found that this operation may be satisfactorily effected manually with the aid of a trowel or similar tool. The rollers 9 and 10 are suitably spaced apart and serve to form the board of an initial thickness which is preferably approximately seventeen-sixty-fourths of an inch.

The strip of board formed by the sheets 7 and 8 with the interposed body of plastic is discharged continuously from between the rollers 9 and 10, and delivered to a horizontal conveyor belt 14, and carried forward to station C where it is subjected to an ironing action by being passed between a pair of horizontal superimposed ironing rollers 15 and 16. The distance between the forming rollers 9 and 10 and the ironing rollers 15 and 16, and the rate of travel of the board therebetween is such that the plastic will have time to swell and partly set. It has been found in practice that to space the ironing rollers from the forming rollers a distance of about seventy-five feet, and to feed the board at the rate of about twenty-five feet per minute, gives very satisfactory results, as the plastic will swell to its fullest extent from the time it is fed between the forming rollers in about three minutes. The ironing rollers 15 and 16 serve to compress the plastic, being spaced apart so that as the board passes therebetween it will be reduced to a finished thickness of about one-fourth of an inch. The compressing action of the ironing rollers compacts the plastic and thereby increases its density and strength. This ironing also insures against the formation of air pockets in the plastic and also serves to tightly press the facing sheets against the plastic body, which, together with the adhesive character of the latter due to the dextrine constituent, insures adherence of the facing sheets to the plastic body throughout their adjacent areas.

The ironing rollers further serve to remove any unevenness or irregularities in the surfaces and thickness of the board due to the expansion of the plastic while interposed between the facing sheets, so that when the product is discharged from between the ironing rollers it will be of uniform thickness and smooth through its upper and lower surfaces. The board thus formed is delivered to a second conveyor belt 17, and is carried forward a distance of about seventy-five feet at the same rate of speed at which it is fed to the ironing rollers, so that any given portion of the board will be exposed to the air about three minutes while being carried forward on the belt 17 for the purpose of effecting an initial drying of the board while it is in motion. The board is thus delivered to station D where it is severed into finished lengths, ranging ordinarily from four to fourteen feet; the board being cut in lengths while in motion by means of a motor-driven saw 18 on a carriage 19 mounted to travel on a track 20 paralleling the advancing strip of board; the saw being mounted on a transversely moving carriage 21 supported on the guideways on the carriage 19 whereby the saw 18 may be moved transversely of the board as the latter advances, and thereby effect severance thereof. The plastic is sufficiently set by the time that the transverse severance is made at station D that a clean cut will be effected so as to render further trimming of the lengths transversely unnecessary. The several lengths of board are then shoved forward by the advancing strip over a line of horizontal rollers 22 and engaged by projections 23 on a belt 24 and are moved forward at an accelerated speed through station E where the longitudinal edges of the board are trimmed by saws 25 to remove ragged edges and reduce the board to finished widths. The board is then carried by the conveyor belt 24 beneath a revolving brush 26 at station F, which brush removes the particles of paper and plastic that may be deposited on the upper surface of the board during the cutting action of the saws 18 and 25. This cleans the board while it is in motion. After being subjected to the cleaning action of the brush 26 the board is carried forward to a discharge mechanism at station G; the board being moved on to spaced horizontal rollers 27 and brought to a stop against an abutment 28; whereupon the finished length of board is picked up from its horizontal position by arms 29 on a rotary shaft 30 and disposed in a nearly vertical position as shown in Figure 3. By the time the board is picked up by the arms 29, the plastic is sufficiently hardened and set to permit its being lifted while in a vertical position and carried clear of the discharge mechanism. In practice about twelve minutes elapse from the time the plastic is initially mixed at station A until discharge from the conveyor is effected at station G.

The board is then transferred from station G to station H where it is deposited on edge on a truck 31, and separated between spacing sticks 32 on the latter. The board may be transferred from station G to station H in any desired manner, being very conveniently carried by hand. Any suitable number of the severed finished lengths of board are placed on the truck 31 with adjacent lengths spaced apart by the sticks 32, whereupon the truck 31, with its load of finished lengths of the board, is moved into a suitable kiln 33 at station I where the board is subjected to a temperature of about one hundred thirty degrees Fahrenheit for about from eighteen to twenty hours which removes all moisture from the board, whereupon it is stacked in sheds as indicated at station J with the board arranged in layers as indicated at 34. The board is then in readiness for shipment and use.

From the foregoing it will be seen that we have provided a method for manufacturing wall board whereby the board may be formed and cut to commercial sizes by a continuous operation.

We claim—

1. The method of manufacturing wall board consisting in interposing a wet, pasty, plastic composition between two advancing sheets of paper and rolling same to form a strip of initial thickness, conveying the strip a distance to permit expansion of the plastic, pressing the strip to compress the plastic and at the same time reduce the strip to final thickness, conveying the compressed strip a distance to permit the plastic to fully set, cutting the strip thus formed into finished commercial lengths and trimming the same while in motion, and subjecting the severed finished lengths to a final drying action.

2. The method of forming a wall board consisting in feeding between two facing sheets a wet, pasty, plastic composition containing dextrine thereby forming a strip of initial thickness, allowing the plastic to expand, compressing the plastic before setting thereof and thereby reduce the strip to finished thickness, reducing the strip to panels of commercial widths and lengths, and finally kiln drying the finished lengths.

3. The method of forming wall board consisting in feeding between two advancing sheets a wet, pasty, plastic composition containing dextrine, thereby forming a strip of initial thickness, allowing the plastic to expand, compressing the plastic before setting thereof and thereby reduce the strip to finished thickness, cutting the strip to form panels of finished lengths, trimming the panels to finished widths, said expansion and compressing of the plastic and the cutting and trimming of the strip being effected while the latter is in continuous motion, and finally kiln drying the resultant panels.

4. The method of manufacturing wall board, consisting in feeding a wet, pasty, plastic composition containing dextrine between two advancing facing sheets, and rolling same to form a strip of initial thickness, conveying the strip a distance to permit expansion of the plastic, compressing the strip while in motion to compress the plastic and at the same time reduce the strip to final thickness, conveying the compressed strip a distance to permit the plastic to set and partly dry, reducing the strip to panels of commercial widths and lengths while same is advancing in a horizontal position, placing the panels thus formed on edge in spaced relation with a plurality of the panels disposed parallel and spaced apart, and subjecting the panels to a kiln drying action.

GEORGE A. BUTTRESS.
JOSEPH A. BUTTRESS.